June 11, 1963 H. STOLL 3,093,583
FILTERS AND PROCESSES FOR MANUFACTURING THE SAME
Filed Oct. 14, 1958

INVENTOR.
Hermann Stoll
BY
Michael S. Striker
Atty

United States Patent Office 3,093,583
Patented June 11, 1963

3,093,583
FILTERS AND PROCESSES FOR MANUFACTURING THE SAME
Hermann Stoll, Bietigheim, Germany, assignor to Firma Robert Bosch G.m.b.H., Stuttgart, Germany
Filed Oct. 14, 1958, Ser. No. 767,140
10 Claims. (Cl. 210—487)

The present invention relates to filters.

More particularly, the present invention relates to the type of filters which are used for filtering lubricating oil or fuels.

Also, the present invention relates to processes for manufacturing such filters.

Conventional filters of the above type have several disadvantages. Conventional filter bodies of the above type, which are usually made of felt, are relatively expensive. Moreover, such filter bodies often lose their elasticity when the medium which flows therethrough has a temperature in excess of 80° C. Therefore, such filters cannot be used at higher operating temperatures, so that, for example, in the case where the circulating lubricating oil of an internal combustion engine is to be filtered or where a relatively heavy fuel oil is heated for easier filtration, as is often the case in ships or stationary installations, such filters cannot be used. Also, such conventional filters are not always capable of resisting the acids contained in or formed in many fuels. Furthermore, under certain circumstances during operation individual fibers become separated from the filter body and flow with the filtered medium to places where the fibers accumulate undesirably. For example, in internal combustion engines which have injection nozzles the fuel which is cleaned by being passed through a filter of the above type may carry along with it fibers which become located at the injection nozzle.

One of the objects of the present invention is to overcome the above drawbacks by providing a filter body which cannot have any loose fibers separated therefrom, which is relatively inexpensive to manufacture, and which will not lose its elasticity when the temperature of the medium which flows therethrough exceeds 80° C. Also, the filter body of the present invention will not break down due to contact with acids formed in or carried by the filtered medium.

Another object of the present invention is to manufacture a filter of the above type in a manner which is not costly and which at the same time provides a filter body which will operate reliably over a long period of time.

A further object of the present invention is to provide a filter which can be cleaned and used repeatedly after cleaning.

With the above objects in view the present invention includes a filter body which is tubular and which is formed by a tubular winding of at least one filament whose convolutions are crinkled and engage each other at a plurality of places while defining minute passages extending through the wall of the tubular filter body. The crinkled convolutions of the filament or filaments of the filter body are joined to each other at the places where they engage each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
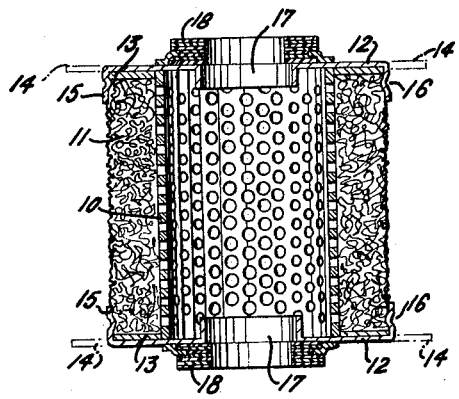
FIG. 1 is an axial sectional elevational view of one possible filter construction according to the present invention.

Referring now to FIG. 1, it will be seen that the filter construction illustrated therein includes an inner substantially rigid perforated tube 10, this tube 10 being surrounded by a tubular filter body 11 whose inner surface is engaged by the tube 10. The tubular filter body 11 is formed from a winding of at least one filament which may, for example, be a polyamide filament. The tubular filter body 11 is located between a pair of annular metal end walls 12 made of sheet metal, for example, and a pair of layers of sealing material 13 are respectively located between and in engagement with the ends of the tubular body 11 and the end wall 12, as illustrated in FIG. 1. These layers 13 may be made of a yieldable material such as, for example, relatively soft paper. The sheet metal end walls 12 are permanently joined with the ends of the rigid tube 10 as by being soldered or welded thereto, for example. The convolutions or windings of the filament or filaments which form the tubular body 11 are crinkled, and the crinkles engage each other at a plurality of places while defining minute passages extending haphazardly through the wall of the tubular filter body 11. At the places where they engage each other, the crinkled convolutions are joined together with any suitable adhesive medium or in other ways which are described below, so that the crinkles cohere at the places where they engage each other. A suitable adhesive medium may be used for joining the layers of sealing material 13 to the ends of the tubular filter body 11.

The medium which is to be filtered is cleaned by passing through the free spaces which are non-uniformly distributed through the filter body 11 and which form the haphazardly arranged minute filtering passages which pass through the filter body 11.

The end walls 12 are originally flat, as indicated by the outer peripheral portions 14 thereof shown in dot-dash lines in FIG. 1. When the parts are assembled, the peripheral portions 14 are bent so as to form the annular flanges 15 which extend axially toward each other, and these flanges 15 are respectively formed with annular ribs 16 extending inwardly toward the axis of the filter, so that in this way the flanges 15 serve to securely hold the filter body 11 at its outer surface adjacent its ends. These flanges 15 serve as an additional seal for the tubular filter body. The end walls 12 respectively have central apertures 17 which are surrounded at the outer faces of the end walls 12 by sealing rings 18 joined to the end walls 12 in any suitable way.

The filter unit shown in FIG. 1 is joined through the medium of the apertures 17 and sealing rings 18 with an unillustrated but known conduit in a filter housing or the like.

Figure 2:
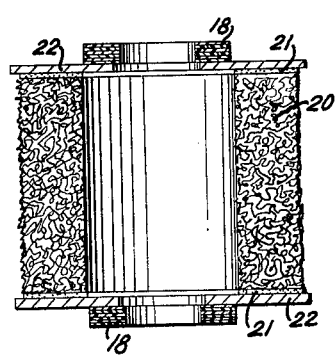
FIG. 2 is an axial sectional elevational view of another embodiment of a filter construction according to the present invention.

In the embodiment which is illustrated in FIG. 2, the filter body 20 does not surround and engage a rigid tube similar to the tube 10 of FIG. 1. Due to the dimensions of the filter body 20 as well as due to the fact that the joining of the crinkled convolutions to each other has been carried out in such a way that the filter body 20 is quite sitff, a tube similar to the tube 10 is not required by the embodiment of FIG. 2. However, the ends of the tubular filter body 20 are joined to a pair of sealing layers 21 which may have the same construction as the layers 13 of FIG. 1, and these layers 21 are in turn joined to a pair of annular end walls 22. The layers 21 are made of an adhesive material and serve additionally to join the end walls 22 to the tubular filter body 20. The walls 22 are formed with central apertures and are also connected with sealing rings similar to the rings 18, so that the embodiment of FIG. 2 may also be assembled into a filter in the same way as the embodiment of FIG. 1.

In the embodiment of FIG. 2 as well as with the embodiment of FIG. 1, as was pointed out above, the tubular filter body is formed by a tubular winding of one or more filaments which may be polyamide filaments, for example. Instead of polyamide filaments, it is also possible to use polyacrylonitrile filaments (Orlon) or it is also possible to use filaments of terephthalic acid polyesters (Terylene). These materials are among others which are capable of being crinkled and used in the filter of the present invention. Another material suitable for the filter according to the invention is polymerized tetra-fluoro-ethylene.

Generally all fibers or filaments made of thermoplastic materials are capable of being crinkled. Those skilled in the art may easily elect from the materials indicated above the material resistant to the kind of fluid to be filtered in each special case.

The filter bodies, such as the bodies 11 or 20, are manufactured according to the present invention in two principal separate stages. The first stage involves the winding of the filament into the form of the tubular filter body, and the second stage involves the joining together of the crinkled convolutions of the filament or filaments of the filter body at the places where the convolutions engage each other. The second stage, namely, that of joining the convolutions to each other need not take place after the first stage and instead can take place simultaneously with the winding of the filament or filaments into the form of the tubular filter body.

The crinkled filament used in the manufacture of the filter body of the present invention can easily be stretched into an uncrinkled condition, and therefore there is a problem involved in winding the filament so that the final filter body does not have the filament convolutions stretched to an extent which eliminates the crinkles.

According to one process of the present invention, it is possible to wind the filament while in stretched uncrinkled condition on a core which is capable of being expanded and contracted and while this core is in its expanded condition. In other words the filament is stretched so that it is no longer crinkled and in this condition of the filament it is wound upon a radially expanded core. After the winding of the tensioned filament on the expanded core is completed, the core is permitted to collapse so that it will contract to its condition of smaller radius, and as a result the tension on the wound convolution is eliminated so that the wound filament again assumes its crinkled condition, and in this way it is possible to provide a tubular filter body having crinkled convolutions which engage each other. Of course, the filaments which are used for the filter bodies of the invention have the property of being resilient enough to return to their original crinkled condition when the tension thereon is eliminated. Expandable and contractable cores which can be used in this process are known. For example, referring to FIG. 1, the tubular support 10 may be made from a pair of half cylinders, and any suitable expanding means may be located between the two half cylinders to spread them apart from each other so as to maintain them in an expanded condition, while the filament is wound, and thereafter the half cylinders are drawn toward each other until they again cooperate to form a single complete cylinder, and as a result the filament or filaments again assume their crinkled condition indicated in FIG. 1. Of course, where the tubular filter body is dimensionally self-sustaining as is the case with the embodiment of FIG. 2, as a result of the stiffness derived from the adhesive which joins the convolutions to each other where they engage each other, for example, it is possible to remove the collapsed core from the interior of the tubular body and then to replace this collapsed core with a one-piece cylindrical tube similar to the tube 10. Thus, if desired, it is possible with the embodiment of FIG. 2, before joining the tubular filter body 20 to the end walls 22 to first slip into the interior of the filter body 20 a tubular member similar to the member 10.

Figure 3:
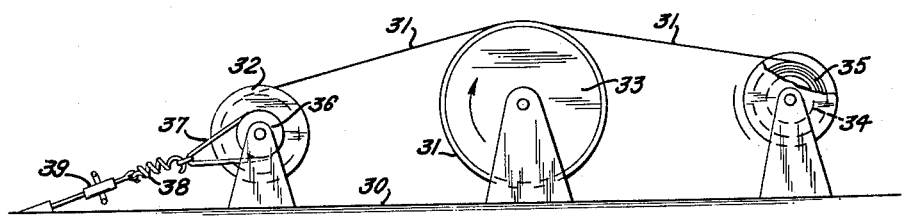
FIG. 3 diagrammatically illustrates one possible process for manufacturing a filter according to the present invention.

Another process for manufacturing the filter body of the present invention is illustrated in FIG. 3. The structure shown in FIG. 3 is carried by a base plate 30. The crinkled filament 31 is obtained from a supply spool 32, and this filament is supplied from the supply spool 32 to a feed roll 33 which serves to feed the filament 31 to the take-up roll 34 on which the filament is wound into the form of a tubular filter body 35 whose convolutions are crinkled and engage each other. The supply spool 32 is mounted for free rotation about its axis, but a suitable means is provided to retard the rotation of the supply spool 32 in an adjustable manner. Thus, as is diagrammatically illustrated in FIG. 3, a brake drum 36 is fixed coaxially to the spool 32 for rotation therewith, and a brake band 37 passes around the brake drum 36 and is connected at one end to a tensioning spring 38, the tension of which is adjusted by an adjustable device 39 which may be in the form of a turnbuckle, for example. Thus, by adjusting the turnbuckle 39 the tension of the spring 38 will be regulated and in this way the braking force provided by the cooperation of elements 36 and 37 will be adjusted. The feed roll 33 rotates in a clockwise direction, as indicated in FIG. 3 by the arrow on the roll 33 at a predetermined speed of rotation, the drive which drives the feed roll 33 at this predetermined fixed angular speed being omitted from FIG. 3. The filament 31 is wound through at least one convolution around the drum or feed roll 33 so that the latter frictionally engages the filament 31 to advance the same toward the take-up roll 34. Thus, due to the winding of the filament 31 around the feed roll 33, the constant angular rotation of the latter will cause the filament 31 to be drawn from the supply spool 32 to the feed roll 33, and the braking structure described above and shown in FIG. 3 serves to retard the rotation of the supply spool 32 to an extent sufficient to tension the filament 31 between the spool 32 and the roll 33 to a degree which will eliminate from the filament all of the crinkles so that the filament reaches the roll 33 in uncrinkled condition and passes around the roll 33 in this same uncrinkled condition. Thus, the feed roll 33 frictionally cooperates with the filament 31 to advance the latter, and in this way the filament 31 is fed at a speed equal to the peripheral speed of the feed roll 33.

The take-up roll 34 is rotated in the same direction and at the same angular speed as the feed roll 33. The drive for the take-up roll 34 also is not shown in the drawing. The tubular body 35 will have certain outer and inner diameters when completed, and midway between these two diameters the tubular filter body 35 has a certain average diameter. The ratio of the diameter of the feed roll 33 to the average diameter of the filter tubular body 35 is the same as the ratio between the length of the filament 31 when the latter is in its stretched uncrinkled condition to the length of the filament 31 when it is in its unstretched crinkled condition. Therefore, the speed with which the filament 31 moves away from the feed roll 33 has this same ratio with respect to the speed with which the filament is wound onto the take-up roll 34. As a result the filament which reaches the feed roll 33 in tensioned uncrinkled condition assumes its untensioned crinkled condition when being wound onto the take-up roll 34, and in this way the convolutions of the tubular filter body 35 are crinkled.

It is also possible to carry out the above-referred to second stage, namely, the joining of the crinkled convolutions to each other at the places where they engage each other in a number of different ways.

Thus, during the winding of the filament into the form of the tubular filter body it is possible to spray an adhesive medium onto the filament, and, if desired, this adhesive medium may be thinned by a suitable volatile solvent. This process for providing an adhesive medium which will cause the crinkled convolutions to become joined together at the places where they engage each other is of particular advantage with the embodiment of FIG. 1, in that the adhesive medium is simultaneously sprayed onto the end walls 12 so that the latter become joined with the ends of the tubular filter body as the latter is formed to provide the seal between the tubular filter body 11 and the end walls 12.

It is also possible, upon completion of the winding of the tubular filter body, to immerse the latter in a bath of a suitable adhesive solution.

In both of the above cases, which is to say either in the case of spraying of the adhesive medium or immersing the tubular filter body into the adhesive medium, the treatment subsequent to the application of the adhesive medium to the filament can include drying of the tubular filter body or suitable heat treatment thereof, or both. Thus, according to the particular adhesive medium and the treatment of the filter body with the adhesive medium on the filament thereof, a simple drying will be provided, or the adhesive medium will become fixed on the convolutions of the filament by polymerization or by hardening. Where the fixing takes place by polymerization, the adhesive medium may be, for example, vinyl acetate or, in an appropriate solvent, that monomer which corresponds to the polymerized substance of the filaments used, such as capro-lactam in the case of filaments made of polyamides, or other substances well known to those skilled in the art.

Where the fixing takes place by hardening, the adhesive medium may be in the form of an epoxy resin or of an isocyanate or, for filaments made of polyamides of a phenol-formaldehyde-resin, or of any other suitable substance known to those skilled in the art.

Some of the substances mentioned above are of course to be used in suitable volatile solvents, as it is well known to those skilled in the art.

Another particularly simple process which is particularly suitable for mass production resides in treating the filament with a volatile swelling agent or solvent, preferably in the form of a vapor, although these agents may also be used in the form of a gas, and in this way to render the exterior surface of the filament tacky so that the convolutions become fused together at the places where they engage each other during drying of the convolutions. After application of the swelling agent or solvent to the filament, the tubular filter body may be dried with air which may be heated, or it may simply be allowed to stand in the open air so that in either of these ways the swelling agent or solvent will evaporate.

The action of such mediums on the filament may be controlled in any desired manner through a suitable choice of the temperature of the treatment and through suitable thinning, for example, by using an unsaturated vapor.

The above-described treatment with a swelling agent or solvent is not limited to the manufacture of a tubular filter body according to the present invention, but also may be used with all filter bodies made-up of fibers or filaments which have exterior surfaces capable of swelling or dissolving when treated with a swelling agent or a solvent, for example. Such fibers or filaments may also contain a suitable swelling agent or solvent which renders them tacky so that they will stick to each other in the desired manner.

In the case where the fibers or the filaments are made of a polyamide, formic acid, particularly in vapor form, or phenolics are suitable swelling agents.

In the case where the fibers or filaments are made of poly-acrylo-nitrile, dimethyl-formamide may be used for example.

Generally, all solvents suitable for a certain material, may be used as swelling agents when sufficiently diluted.

Suitable solvents which may be used with polyamide filaments are methyl ethyl ketone or phenolics, for example. The last-described process for joining the convolutions to each other at the places where they engage each other, which is to say by the use of a suitable swelling agent or solvent, has the great advantage that when the convolutions are joined together there is no excess of adhesive medium which remains in the tubular filter body. Thus, with this process for joining the convolutions to each other there will be no uncontrollable reduction in the size of the minute passages which extend through the wall of the tubular filter body, as might occur where the adhesive is applied to the filter body by immersing the latter into a bath of a suitable adhesive medium. When the filter body is removed from this bath and dried, there may be some excess adhesive medium which may undesirably reduce the size of the minute passages extending through the wall of the filter body.

As has been pointed out above, the filament used in the filter body of the present invention has the property of being resilient so that while it can be stretched so as to have an uncrinkled condition, it will again assume a crinkled condition when the tension is removed. Such a crinkled filament may be formed, for example, through suitable thermal treatment of an uncrinkled filament made of a suitable plastic material such as a polyamide, and the crinkling of the filament may take place just before it is wound into the form of the tubular filter body. Thus, the crinkling may be provided by passing the filament for a short time through a tubular heating device. The crinkling may also be accomplished as it is well known to those skilled in the art by passing the filament between a pair of heated intermeshing toothed crimping rolls. Such an operation may be repeated as far as required with one or more pairs of crimping rolls the teeth of which have different pitches.

It will be understood that each of the elements described above, or two or more together, may also find a useful application in other types of filter differing from the types described above.

While the invention has been illustrated and described as embodied in tubular filter bodies, it is not intended to be limited to the details shown, since various modifications are structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A filter body comprising a tubular winding of thermoplastic crinkled filamentary material having windings provided with crinkles which engage each other at a plurality of places while at the same time defining small haphazard passages through the wall of the tubular filter body, said crinkles cohering at said places where they engage each other; and a pair of annular closure means respectively located at the ends of said tubular winding and closing the wall thereof at the ends of said wall so that the medium which is filtered must flow substantially radially through said passages of the wall of said body.

2. In a filter, in combination, a tubular filter body composed of a tubular winding of thermoplastic filamentary material having windings provided with crinkles which engage each other at a plurality of places while forming minute haphazard passages through the wall of the tubular filter body, said crinkles cohering at said places; an inner substantially rigid perforated tube surrounded by and engaging the inner surface of said tubular filter body; and a pair of annular closure means respectively located at the ends of the wall of said tubular body for closing said wall and said ends thereof so that the filter medium is constrained to flow substantially radially through said wall of said body in said passages thereof.

3. For use in a filter, in combination, a tubular filter body composed of a tubular winding of thermoplastic crinkled filamentary material having windings provided with crinkles which engage each other at a plurality of places while at the same time defining small haphazard passages through the wall of the tubular filter body, said crinkles cohering at said places where they engage each other; an inner substantially rigid perforated tube surrounded by said tubular filter body and engaging the inner surface thereof; and a pair of annular end walls fixed to the ends of said tube, respectively, extending radially therefrom, and between which said tubular filter body is located, said end walls respectively having at their outer peripheries annular flanges extending axially toward each other and surrounding and engaging the tubular filter body at its outer surface adjacent the ends thereof, respectively, said end walls closing the tubular filter body at the ends of its wall for constraining the filter medium to flow substantially radially through the wall of said filter body in said passages thereof.

4. For use in a filter, in combination, a tubular filter body composed of a tubular winding of thermoplastic crinkled filamentary material having windings provided with crinkles which engage each other at a plurality of places while at the same time defining small haphazard passages through the wall of the tubular filter body, said crinkles cohering at said places where they engage each other; a pair of annular end walls located adjacent the ends of said tubular filter body, respectively; and a pair of layers of sealing material respectively located between and engaging the ends of said tubular filter body and said end walls, so that the medium which is filtered is constrained to flow substantially radially through the wall of said tubular body in said passages thereof.

5. The combination of claim 4 and wherein said layers are made of flat sheets of yieldable material.

6. The combination of claim 5 and wherein said sheets are made of paper.

7. The combination of claim 4 and wherein said layers are made of an adhesive material.

8. A filter body comprising a tubular winding of crinkled polyamide filamentary material having windings provided with crinkles which are crinkled and engage and cohere to each other at a plurality of places while defining minute haphazard passages through the wall of the tubular filter body; and a pair of annular closure means respectively located at the ends of said tubular filter body for closing the wall thereof at the ends of said wall so that the medium to be filtered is constrained to flow substantially radially through said passages.

9. A filter body comprising a tubular winding of crinkled polyacrylonitrile filamentary material having windings provided with crinkles which engage and cohere to each other at a plurality of places and define minute haphazard passages through the wall of the tubular filter body; and a pair of annular closure means respectively located at the ends of said tubular body closing the wall thereof at the ends of said wall so that the medium to be filtered is constrained to flow substantially radially through the wall of said body in said passages thereof.

10. A filter body comprising a tubular winding of crinkled terephthalic acid polyester filamentary material having windings provided with crinkles which engage and cohere to each other at a plurality of places and define haphazard minute passages through the wall of the tubular body; and a pair of annular closure means respectively located at the ends of said tubular body closing the wall thereof at the ends of said wall to constrain the medium to be filtered to flow substantially radially through the wall of said tubular body in said passages thereof.

References Cited in the file of this patent

UNITED STATES PATENTS

| | | |
|---|---|---|
| 1,515,556 | Dreaper | Nov. 11, 1924 |
| 2,028,061 | Goldman | Jan. 14, 1936 |
| 2,115,577 | Goldman | Apr. 26, 1938 |
| 2,336,797 | Maxwell | Dec. 14, 1943 |
| 2,476,274 | Blake | July 19, 1949 |
| 2,537,897 | Hunter | Jan. 9, 1951 |
| 2,650,414 | Kreamer | Sept. 1, 1953 |
| 2,711,982 | Straka | June 28, 1955 |
| 2,778,090 | Hasler | Jan. 22, 1957 |
| 2,794,239 | Crawford | June 4, 1957 |
| 2,807,862 | Griset | Oct. 1, 1957 |
| 2,828,239 | Fisher | Mar. 25, 1958 |
| 2,829,775 | Krogman | Apr. 8, 1958 |
| 2,834,730 | Painter | May 13, 1958 |

FOREIGN PATENTS

| | | |
|---|---|---|
| 369,943 | Germany | Feb. 24, 1923 |
| 1,082,778 | France | June 23, 1954 |